Sept. 6, 1932.    J. CIRRITO    1,875,561
METHOD OF TRAINING GRAPEVINES
Filed Jan. 23, 1931    2 Sheets-Sheet 1
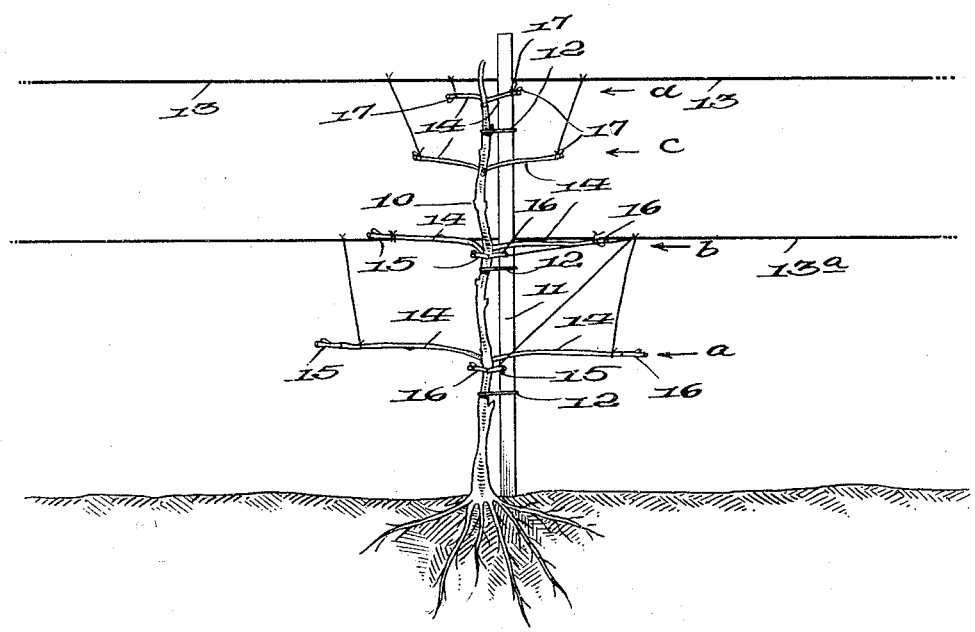
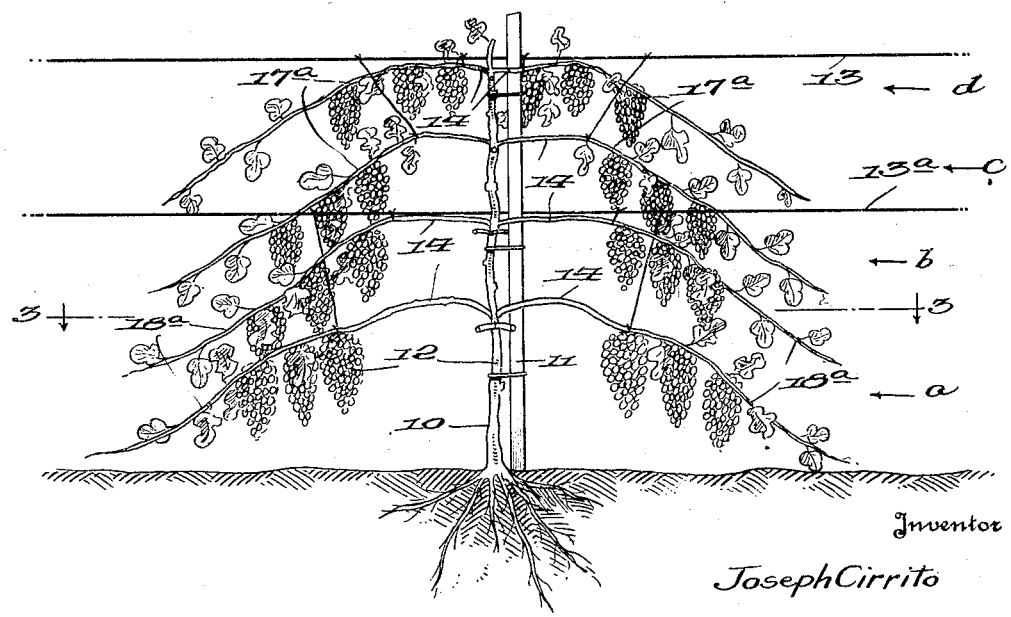
Inventor
Joseph Cirrito
By Charles A. Sovino
Attorney

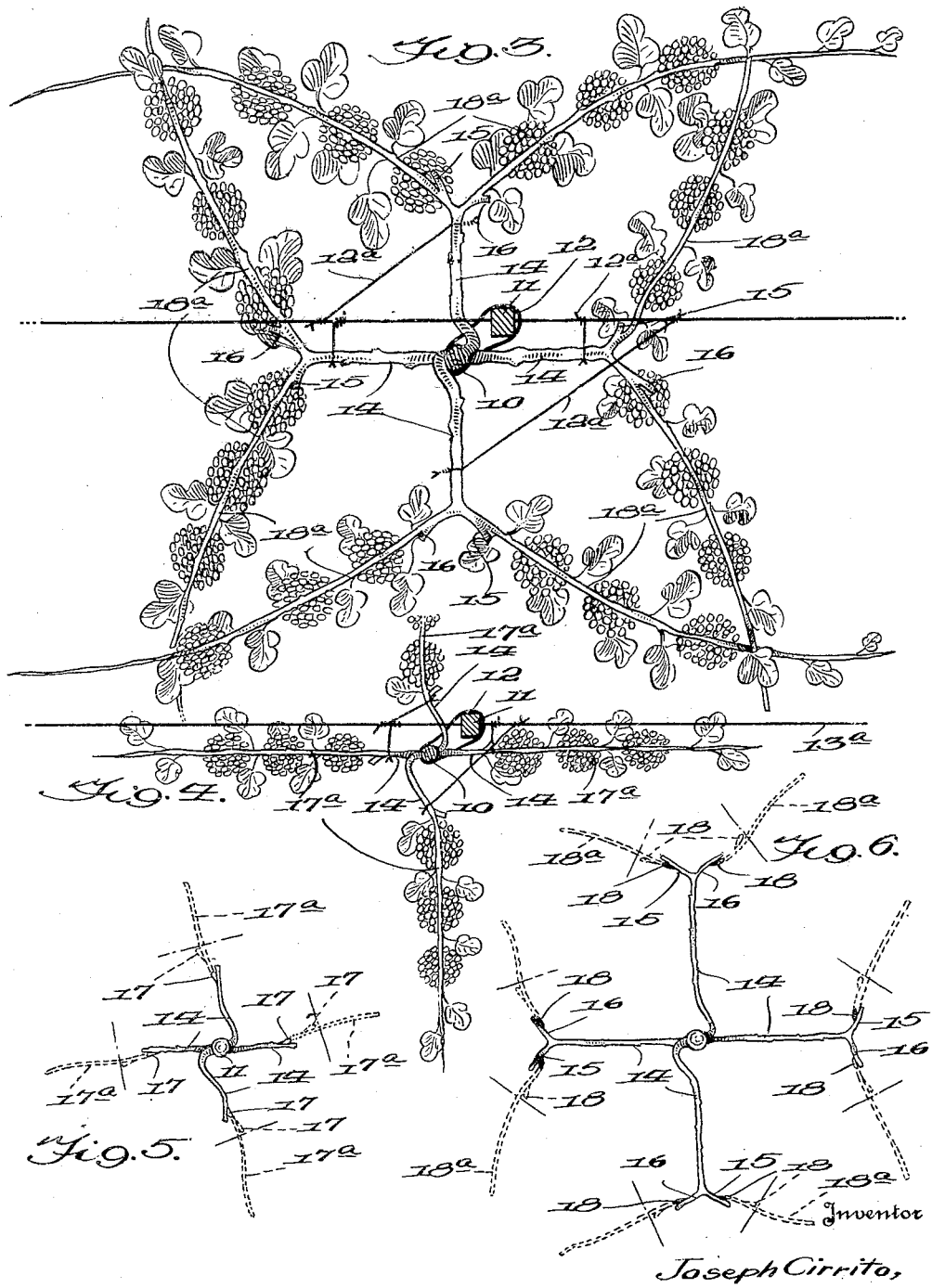

Patented Sept. 6, 1932

1,875,561

UNITED STATES PATENT OFFICE

JOSEPH CIRRITO, OF JERSEY CITY, NEW JERSEY

METHOD OF TRAINING GRAPEVINES

Application filed January 23, 1931. Serial No. 510,810.

The present invention is an improved method of training grapevines.

The invention aims primarily to train a vine to substantially bush or tree form in order that there be a more equal distribution of the plant juices to the fruit, greater exposure of the fruit and foliage to the sunlight and air, greater productivity and better quality of fruit, and labor-saving in pruning and tying the vine and in picking the matured fruit.

It has been noted that under present systems of training, the arms of grapevines are permitted to extend a great distance from the main trunk, thus detracting from the growth of the main trunk and requiring a great deal of expenditure of time or money for pruning and tying, as well as for picking the matured fruit, because the fruit is scattered all over the plant. Under these systems, multiple stories or courses are unsuccessful primarily due to the fact that the lower and inner arms or branches as well as the fruit borne by them are deprived of their proper share of sunlight, and also because the number of buds on each arm or branch is not sufficiently restricted.

Many of the disadvantages of the present systems are overcome and the objects of the present invention are obtained, broadly, by training the main trunk or stem of the vine vertically with a multiple series of horizontal arms or branches, the arms in each story preferably radiating in at least four directions; by pruning or cutting so that the vine assumes a conical form or shape, and by limiting the length of the arms or branches and restricting the number of buds on each arm to those at the extremities of the branches, in order to obtain the best fruit only.

In order that a clear understanding of the method of the present invention may be had, the same is set forth with particularity in the following description, reference being made to the accompanying drawings, which illustrate by way of example certain steps of the method.

In the drawings:

Fig. 1 is an elevation of a vine which has been trained and pruned in accordance with the present method;

Fig. 2 is a vertical section of the vine in foliage and bearing fruit and to one side of the trunk;

Fig. 3 is a transverse sectional view through the vine and taken substantially on line 3—3 of Fig. 2;

Fig. 4 is a plan view of the top story of vine in foliage;

Fig. 5 is a plan view of the top story or course of the vine after pruning, the dotted lines indicating the repruned condition of the vine the succeeding year; and Fig. 6 is a plan view of the lower story or course of the vine after pruning, the dotted lines indicating the repruned condition of the vine the succeeding year.

In carrying the invention into practice, the main stem 10 of the grapevine is staked to a post 11, by any suitable means 12, so that the stem will grow vertically as a tree trunk. If old plants are to be trained according to the present method, it may be found to be better to cut off the old stem to about two feet above the ground and train a cane extending therefrom or near the base of the stem. If there is no cane two feet from the ground it may be necessary to graft one.

The plants are planted about six feet apart in rows about six and a half feet to seven feet apart, the latter being preferred. The posts 11 in each row are preferably about five feet six inches in height above the ground and connected together by spaced horizontal strands of wire 13 and 13a which are to support the post in position and serve as supports to which the branches of the vine may be tied, if convenient.

With the stem or trunk of vine staked, canes from the trunk are selected so as to form a series of stories or courses, two or more, in number, although it is preferred to provide four of such stories, $a$, $b$, $c$, $d$. It is aimed to provide four canes in each story and to arrange them, by bending certain of them, to extend or radiate from the trunk in four directions as indicated in Figs. 4 and 5. It is purposed that canes or arms should be as nearly at right angles with respect to each other as is practical, but of course should there be more or less canes in each story, they should be arranged in equally spaced positions around the trunk. The canes which are bent to position are held therein by wires or cords connected with the post 11 or the trellis wires 13 and 13a, as convenient or desirable, until nature has set them in their positions.

The lower story a is provided about two feet above the ground, and the other three stories about one foot apart.

Each cane in the top story or course d is cut to approximately six inches in length from the center of the trunk, and the canes of succeeding lower stories or courses are cut to a length approximately four inches longer than the canes of the preceding upper course, so as to form a conically shaped plant of a diameter of about twelve inches at the head and uppermost course and thirty-six inches at its lowermost course, when in pruned condition.

The extremities of the canes of the two lower courses or stories a and b are so selected and cut to have forked stubs 15 and 16, see Figs. 3, 5 and 6, while the extremities of the canes of the two upper stories are not forked; but in some instances it is preferable to fork all canes in all of the stories or courses. The number of buds on the vine are restricted by removing all buds except one bud 17 near the extremity of each cane 14 of the upper two stories and one bud 18 on each fork stub 15 and 16 of lower stories; from which buds, shoots 17a and 18a develop and bear the crop of the season, as clearly illustrated in Figs. 2 and 3. The shoots 17a of the two upper stories will grow as continuating extensions of the canes 14 and the shoots 18a of the fork stubs 15 and 16 will grow in like manner as shown particularly in Fig. 3, with the fruit foliage all around, exposed to the sunshine and air, there being approximately three bunches of grapes on each shoot.

Due to the present method of training and pruning, a more equal distribution of the plant juices to the fruit-bearing canes is obtained and due to the full exposure to the sunlight and air which all of the fruit and foliage receives, the resultant fruit will be much larger in size and better in quality as to sweetness, flavor, color and juice content.

Of course, it will be understood that by the next succeeding season and by natural development, the canes 14 will become the permanent arms or branches of the vine and will substantially maintain their proportionate lengths. After two or three years, the plant will have formed, having as its permanent body the trunk 10 and the arms or branches 14, from the extremities only of which canes are allowed to develop each year for the season's crop and then cut back to the first eye or bud nearest the extremities of the branches. Now, after the fruit has matured and is ready for picking, this may be readily done with great facility as the plant is no taller than the height of the average man or woman and all the fruit has grown on the outer sides of the plant. If desired, a large basket or container may be placed under the plant, and, as the fruit is cut, it may be allowed to drop therein. When the fruit is gathered and it is time for pruning, the shoots 17a of the two upper stories c and d, and which shoots have now developed into canes, are cut back to the first eye nearest the arm or branch 14 thereof, while the shoots or canes 18a of the two lower stories a and b are each cut back to the first eye nearest the fork stub 15 or 16, respectively.

Pruning will leave the plant in a condition similar to that previously described and shown in Fig. 1, and as illustrated in full and dotted lines of Figs. 5 and 6. From the eyes which have been left on the canes which have been cut back, new buds or shoots will develop which will be the fruit-bearing shoots of the next succeeding season; and, so on, the method of pruning is repeated year after year in this manner, namely, by limiting the shoots allowed to develop to one or two at the extremities of each arm or branch, as will best permit the sunlight to the fruit and foliage. It is important to note, however, that in the beginning, and in the spring, the vine produces a large number of buds, all of which should be removed as soon as they grow except those which have been hereinabove specified.

After eight or ten years, according to the climate, the plant need not be tied because the trunk will be strong enough to be self-sustaining in a vertical position and the arms or branches 14 will have become set in their radiating positions and strong enough to sustain the shoots and their fruit. It is preferred, as shown, not to tie up the fruit-bearing shoots 17a and 18a, but allow them to droop and assume a natural position. Consequently, when it is time to prune, it is not necessary to untie or to retie the plant, but only do such repair tying as may be necessary. The reduction of time, labor and cost in this operation alone is a material consideration, because in the growing of grapes, tying and pruning is a major cost.

Should, for any reason, it become necessary or desirable to remove any of the arms or branches 14 or the trunk itself, this may be done by cutting the desired parts off and permiting new canes to develop for the parts removed and training them as herein first set forth.

While in the specification certain dimensions have been referred to, it is to be understood that these specific dimensions are only given as an aid and by way of example and that the dimensions may be varied from as further experimentation, practice and convenience may indicate necessary or desirable, without departing from the spirit and scope of the invention, so long as the general scheme of the method and proportions are substantially adhered to.

Obviously, by the present method the tying of grapevines is greatly reduced and the expense and labor incident thereto are greatly minimized, because once the arms or branches 14 are tied, no further tying, except possible repair tying, is necessary; and, when pruning, time is saved because the person pruning is not required to make a selection among the branches, but need only cut back all the canes as indicated in Figures 5 and 6.

Moreover, by the present method of training and pruning grapevines, they may be trained into a symmetrical and pleasing appearing tree or bush-like shape, with the permanent body of the vine becoming strong and self-supporting, and greatly facilitating the work of pruning, picking and spraying, and the plant, in general, being compact, yet permitting the greatest amount of sunlight to the lower branches or fruit-bearing canes; and, further, the expenditure of time and money for pruning and tying, and picking the matured fruit, is reduced to a minimum; and by restricting the number of buds on each arm to one on the new canes at the extremities of the arms or branches, the best fruit is produced.

While the above method is described with particular reference to grapevines, it is manifest to those skilled in the art that it may be employed with equal efficiency to other vines and even to trees, and these are contemplated as being within the scope of the invention and of the appended claims.

Having thus described the invention, and the method by which it may be performed, what is claimed as new and upon which it is desired to secure Letters Patent, is:—

1. A method for training a vine which has had the trunk stem thereof trained to a substantially vertical position and provided with a series of spaced horizontal stories each consisting of a number of branches or arms radiating from the trunk, said method including pruning the arms and trunks to remove all canes and buds except one cane at the extremities of said branches, and cutting back said retained cane to the first eye nearest the branch.

2. A method for training a vine which has had the trunk stem thereof trained to a substantially vertical position and provided with a series of spaced horizontal extending stories each consisting of a number of branches or arms radiating from the trunk in substantially equi-spaced relation, the extremities of certain stories being forked, said method including pruning the arms and trunks to remove all canes and buds except one cane at the extremity of each branch or of each fork thereof, cutting back said retained canes to the first eye thereon nearest its respective branch or fork thereof.

3. A method for training vines which includes training the trunk stem of a vine to a substantially vertical position; pruning the stem to remove all buds and canes except certain canes to provide a vertical series of substantially horizontally spaced stories each consisting of a number of canes, training and holding said canes of each story to radiate from the trunk in substantially equi-spaced relation and pruning said canes to produce arms or branches, and permitting but one shoot to develop each year at the extremities of said branches, and, after fruiting, cutting back the canes formed by said shoots to the first eye thereon nearest their respective branches.

4. A method of training vines which includes training the trunk stem of a vine to substantially vertical position; pruning the stem to remove all buds and canes except certain canes to provide a vertical series of substantially horizontal stories, each story consisting of approximately four canes, training and holding said canes of each story to radiate from the trunk stem in substantially equi-spaced relation; pruning said canes to produce arms or branches in each succeeding story of increased length from the top, with ends of the branches of certain stories forked; and permitting only one shoot to develop each year at the ends of said branches only, or on each one of its forks; and, after fruiting, cutting back the canes formed by said shoots to the first eye thereon nearest their respective branches or forked stubs thereof.

5. A method for training and pruning vines including training the trunk stem of the vine to a substantially vertical position, pruning and training lateral canes projecting from the stem to form horizontally extending arms or branches arranged in a spaced vertical series of stories; bending, and holding until set, said lateral canes in each story so as to be substantially equi-distantly apart around the trunk and pruning said canes so as to render the arms or branches in each succeeding upper story from the lowermost story of progressively decreasing lengths; pruning the branches and trunk so as to remove all canes and buds except one cane at the end of each branch or fork thereof; and cutting back these canes, and the canes which will develop therefrom each succeeding year, to the first eye adjacent the extremities of said branches.

6. A method for training and pruning vines including training the trunk stem of the vine to a substantially vertical position and maintaining the same at a height approximately five feet; pruning and training lateral canes projecting from the stem to form horizontally extending arms or branches arranged in a spaced vertical series of stories with the lowermost story approximately two feet from the ground and the succeeding upper stories approximately one foot apart; bending, and holding until set, said lateral canes in each story so as to be substantially equi-distantly apart around the trunk; pruning said canes so as to produce arms or branches in the uppermost story of approximately six inches in length and the other stories progressively increasing in length by about four to six inches, and so that the branches in the two lower stories at least will be forked; pruning the branches and trunk so as to remove all canes and buds except one cane at the end of each branch or fork thereof; and cutting back these canes, and the canes which will develop therefrom each succeeding year, to the first eye adjacent the extremities of said branches.

7. A method for training vines including training to substantially vertical position the trunk stem, or cane which will form the trunk; pruning said trunk to provide a series of superposed spaced stories with each story comprising three or more substantially horizontally extending canes; bending certain of said canes in each story to substantially equi-spaced radiating position and holding them until nature sets them in that position; pruning the canes of said stories so that the cane of each successive upper story is of less length than the preceding lower story, removing all the buds from said canes and trunk except at the extremities of said canes.

8. A method for training vines including training to substantially vertical position the trunk stem, or cane which will form the trunk; pruning said trunk to provide a series of vertical spaced stories with each story comprising a plurality of substantially horizontally extending canes; bending certain of said canes in each story to substantially equi-spaced radiating position and holding them until nature sets them in that position, pruning the canes of said stories so that the cane of each successive upper story is of less length than the preceding lower story; removing all the buds, shoots or canes from said canes and trunk, except one cane developed each succeeding year at the extremities of said first canes or arms; and cutting back said new canes to the first eye thereon nearest the extremities of said first canes.

In testimony whereof I have hereunto set my hand.

JOSEPH CIRRITO.